United States Patent
Schmidl et al.

(10) Patent No.: US 7,349,379 B2
(45) Date of Patent: Mar. 25, 2008

(54) CHANNEL NORMALIZATION

(75) Inventors: Timothy M. Schmidl, Dallas, TX (US);
Eko N. Onggosanusi, Allen, TX (US);
Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 782 days.

(21) Appl. No.: 10/640,184

(22) Filed: Aug. 13, 2003

(65) Prior Publication Data
US 2004/0033791 A1  Feb. 19, 2004

Related U.S. Application Data

(60) Provisional application No. 60/403,163, filed on Aug. 13, 2002.

(51) Int. Cl.
*H04B 7/216* (2006.01)
*H04B 7/08* (2006.01)
*H04B 17/02* (2006.01)
*H04B 15/00* (2006.01)
*H04B 7/00* (2006.01)
*H04B 1/18* (2006.01)

(52) U.S. Cl. ............ 370/342; 370/335; 455/132; 455/139; 455/63.1; 455/500; 455/501; 455/154.1

(58) Field of Classification Search ........... 455/132, 455/139, 63.1, 500, 501, 154.1; 370/335, 370/342
See application file for complete search history.

(56) References Cited

U.S. PATENT DOCUMENTS

| 6,584,161 B2 * | 6/2003 | Hottinen et al. ........... 375/299 |
| 6,754,286 B2 * | 6/2004 | Hottinen et al. ........... 375/299 |
| 2003/0148770 A1 * | 8/2003 | Das et al. ................ 455/455 |

* cited by examiner

Primary Examiner—Barry Taylor
(74) Attorney, Agent, or Firm—Wade J. Brady, III; Frederick J. Telecky, Jr.

(57) ABSTRACT

Soft estimate normalization for weighted multiantenna high-order modulation data channel together with separate antenna pilot channels using averaging in first time slots of a transmission time interval with corrections for subsequent time slots.

13 Claims, 4 Drawing Sheets

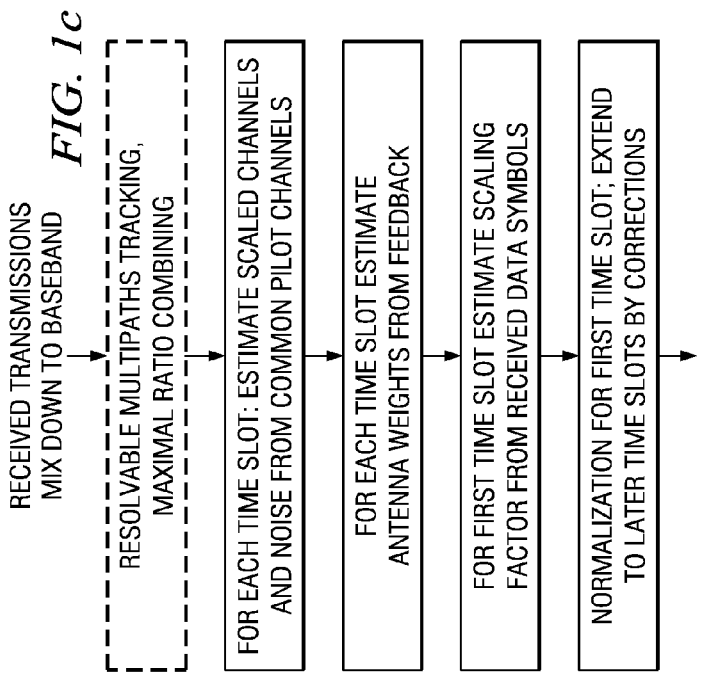
FIG. 1c
FIG. 1a
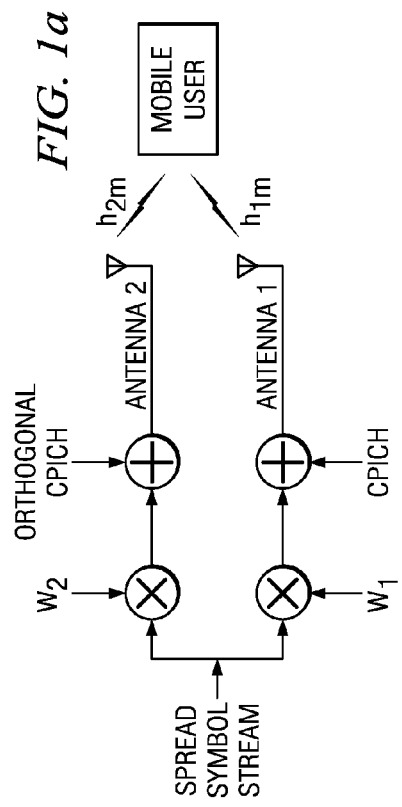
FIG. 1b

CHANNEL NORMALIZATION

CROSS-REFERENCE TO RELATED APPLICATIONS

This application claims priority from provisional application Ser. No. 60/403,163 filed Aug. 13, 2002.

BACKGROUND OF THE INVENTION

The present invention relates to digital communications, and more particularly to mobile wireless systems and methods.

Spread spectrum wireless communications utilize a radio frequency bandwidth greater than the minimum bandwidth required for the transmitted data rate, but many users may simultaneously occupy the bandwidth. Each of the users has a pseudo-random code for "spreading" information to encode it and for "despreading" (by correlation) received spread spectrum signals to recover the information. Such multiple access typically appears under the name of code division multiple access (CDMA). The pseudo-random code may be an orthogonal (Walsh) code, a pseudo-noise (PN) code, a Gold code, or combinations (modulo-2 additions) of such codes. After despreading the received signal at the correct time instant, the user recovers the corresponding information while other users' interfering signals appear noise-like; indeed, a single user can receive multiple independent channels of information through use of multiple spreading codes. For example, the interim standard IS-95 for such CDMA communications employs channels of 1.25 MHz bandwidth and a pseudo-random code pulse (chip) interval $T_c$ of 0.8138 microsecond with a transmitted symbol (bit) lasting 64 chips. The recent wideband CDMA (WCDMA) proposal employs a 3.84 MHz bandwidth and the CDMA code length applied to each information symbol may vary from 4 chips to 512 chips. The UMTS (Universal Mobile Telecommunications System) approach UTRA (UMTS Terrestrial Radio Access) provides a spread spectrum cellular air interface with both FDD (frequency division duplex) and TDD (time division duplex) modes of operation. UTRA currently employs 10 ms duration frames partitioned into 15 time slots with each time slot consisting of 2560 chips ($T_c$=0.26 microsecond).

The CDMA code for each user is typically produced as the modulo-2 addition of a Walsh code with a pseudo-random code (two pseudo-random codes for QPSK modulation) to improve the noise-like nature of the resulting signal. A cellular system could employ IS-95 or WCDMA for the air interface between the base station and multiple mobile user stations.

A spread spectrum receiver synchronizes with the transmitter by code acquisition followed by code tracking. Code acquisition performs an initial search to bring the phase of the receiver's local code generator to within typically a half chip of the transmitter's, and code tracking maintains fine alignment of chip boundaries of the incoming and locally generated codes. Conventional code tracking utilizes a delay-lock loop (DLL) or a tau-dither loop (TDL), both of which are based on the well-known early-late gate principle.

The air interface leads to multipath reception from a single transmitter, and a RAKE receiver has individual demodulators (fingers) tracking separate paths and combines the finger results to improve signal-to-interference-plus-noise ratio (SINR). The combining may use a method such as the maximal ratio combining (MRC) in which the individual detected signals in the fingers are synchronized and weighted according to their signal strengths or SINRs and summed to provide the decoding statistic. That is, a RAKE receiver typically has a number of DLL or TDL code tracking loops together with control circuitry for assigning tracking units to the strongest received paths. Further, arrays of antennas allow for detection of and transmission with signal directionality by phasing the combined signals among the antennas the signals from or to a single user. FIGS. 2a-2d illustrate functional blocks of various CDMA receivers and transmitters.

For FDD mode the physical synchronization channel appears in each of the 15 time slots of a frame and occupies 256 chips out of the 2560 chips of the time slot. Thus a base station transmitting in the synchronization channel a repeated primary synchronization code of pseudo-noise of length 256 chips modulated by a length 16 comma-free code (CFC) allows a mobile user to synchronize by first synchronizing to the 256-chip pseudo-random code to set slot timing and then using the cyclic shift uniqueness of a CFC to set frame timing. Further, decoding the CFC by the mobile user reveals the scrambling code used by the base station.

Antenna arrays for the base station (e.g., 2 to 16 antennas in a linear array) and possibly also for the mobile users (e.g. 2 antennas) can improve data rates or performance. For example, transmit adaptive array (TxAA) is a two-antenna diversity technique which adjusts antenna weights (relative phase and possibly also the power balance between the two antennas) at the base station to maximize SINR at the mobile user. TxAA can be used in the proposed 3GPP standard for a high speed downlink packet access (HSDPA) in WCDMA which transmits packets in a 2 ms (3 time slots) transmission time interval (TTI). Packets may be transmitted with either 16-QAM or QPSK modulation. Within a TTI the ratio between the transmitter power for the pilot symbol channel (CPICH) and the transmitter power for the high-speed downlink shared channel (HS-DSCH) does not change. This requirement of a constant power ratio during a TTI allows a mobile user to estimate the power ratio in the first time slot of the TTI which would then be valid for the remaining two time slots of the TTI. Indeed, due to the timing constraints at the mobile user for decoding the packet and reporting an ACK or NAK to the base station, there is insufficient time to make power ratio estimations in every time slot if each estimation takes one time slot. This implies a problem of changing antenna weights within a TTI for TxAA mode 1 and mode 2 which adjust weights at the base station based upon feedback (e.g., FDD) from the mobile user.

SUMMARY OF THE INVENTION

The present invention provides a method of normalization for multiantenna data channels with separate pilot channels and constant pilot/data amplitude ratio within a transmit time interval with normalizations by corrections of an initial normalization and/or with amplitude ratio estimation by averaging over an initial portion of the transmit time interval.

This has advantages including allowing for antenna weight changes within a transmit time interval.

BRIEF DESCRIPTION OF THE DRAWINGS

The drawings are heuristic for clarity.

FIGS. 1a-1c show a two-antenna system and a flow diagram.

DESCRIPTION OF THE PREFERRED EMBODIMENTS

1. Overview

Figure 2A:
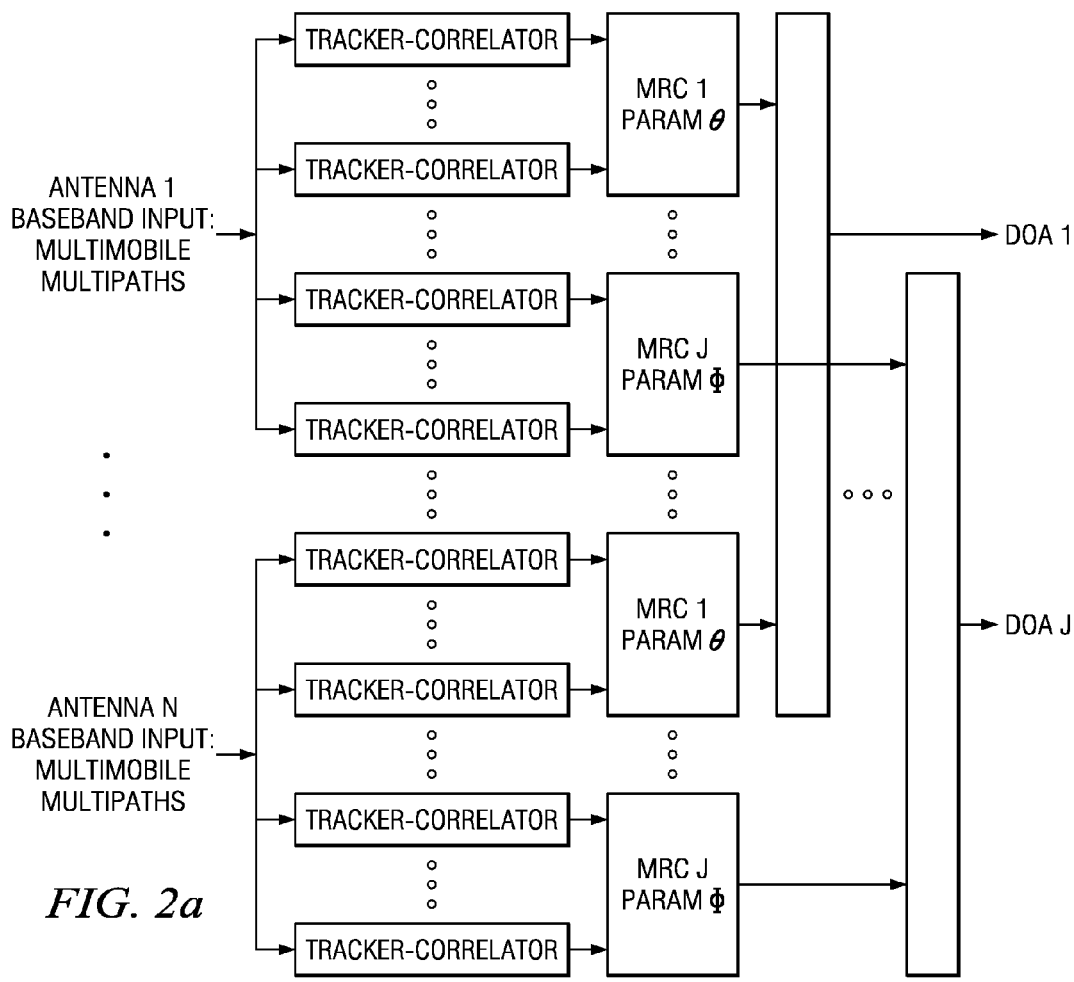
FIGS. 2a-2d illustrate functional blocks of generic CDMA receivers and transmitters.
Figure 2B:
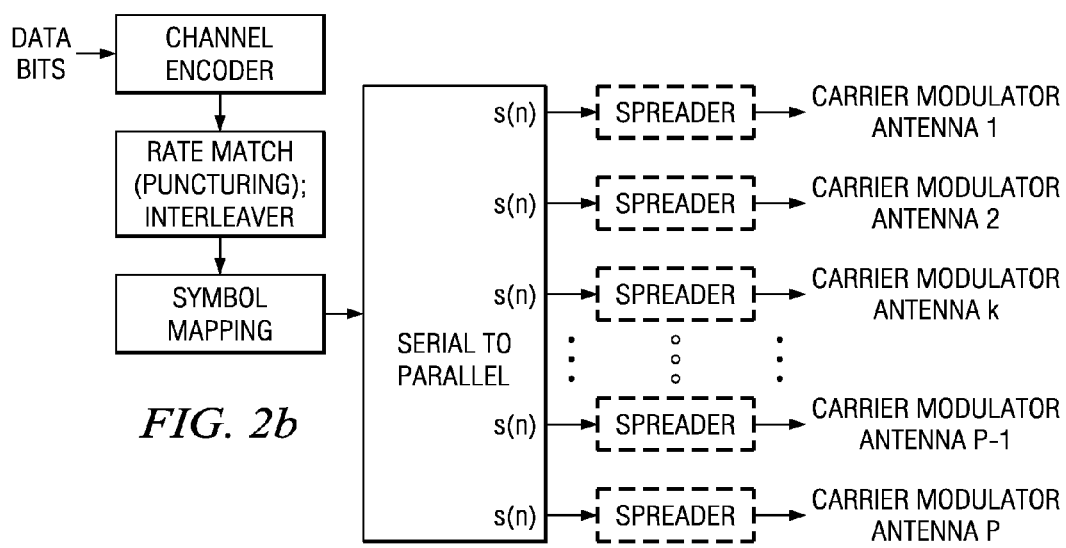
Figure 2C:
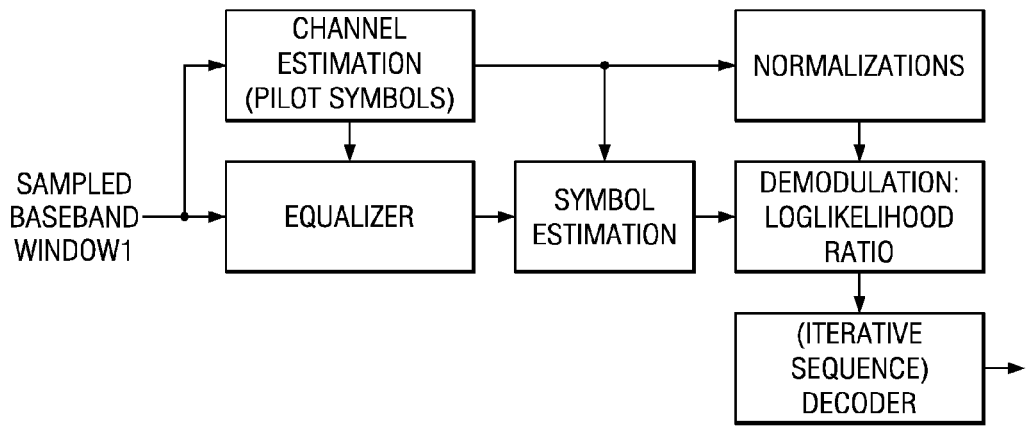
Figure 2D:
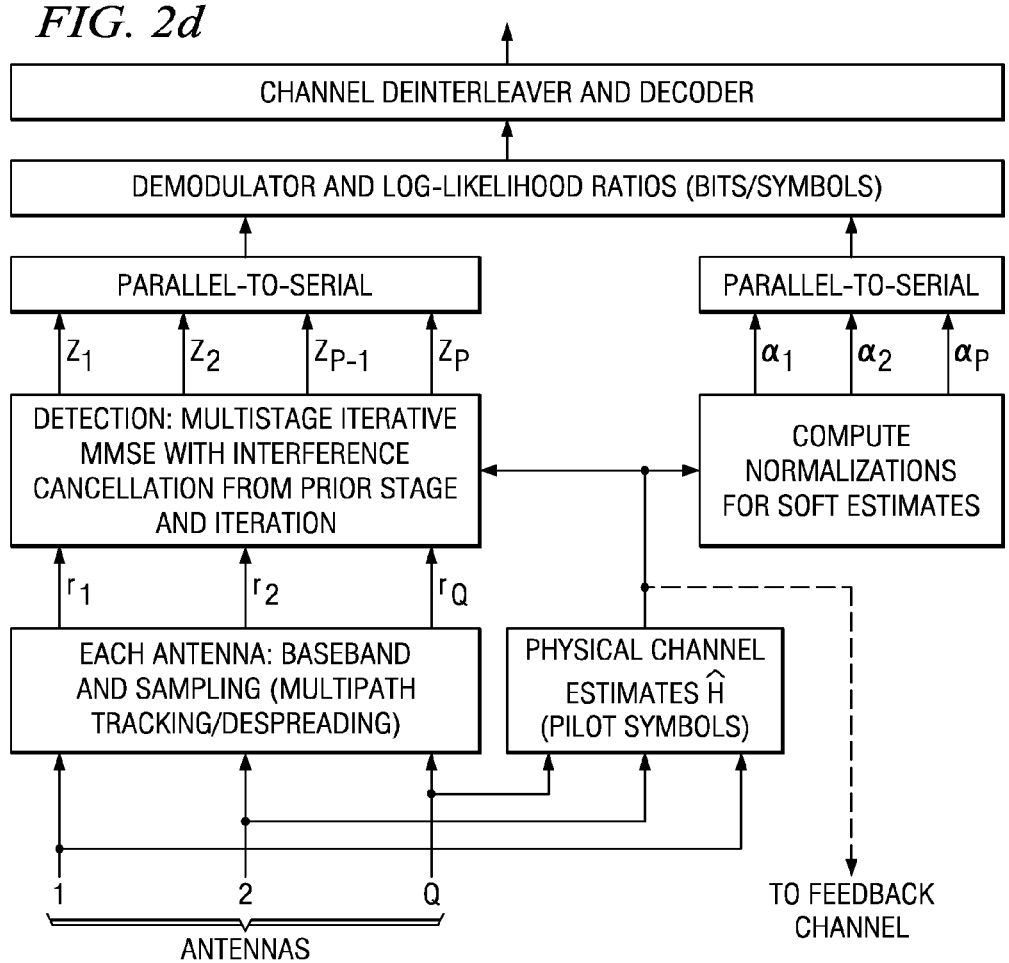

The preferred embodiments are methods of estimation for weighted multi-antenna data packet CDMA; FIG. 1a illustrates a two-antenna system. The methods provide: estimating signal amplitudes in the first time slot of a multi-time slot transmit time interval (TTI) and then applying correction factors to use the amplitude estimate in subsequent time slots; changing channel coefficient estimates within a time slot; and estimating amplitudes from statistics of small sets of received symbols. These have advantages including allowance for changing antenna weightings from time slot to time slot within a TTI; adaptation to rapidly changing transmission channels; and rapid estimation in a time slot.

In preferred embodiment communications systems (e.g., cellular systems) a base station (Node B) and a mobile user (user equipment, UE) could each include one or more digital signal processors (DSPs) and/or other programmable devices with stored programs for performance of the signal processing of the preferred embodiment methods. Alternatively, specialized circuitry (ASICs) could be used. The base stations and mobile users may also contain analog integrated circuits for amplification of inputs to or outputs from antennas and conversion between analog and digital; and these analog and processor circuits may be integrated on a single die. The stored programs may, for example, be in ROM or flash EEPROM integrated with the processor or external. The antennas may be parts of receivers with multiple finger RAKE detectors. Exemplary DSP cores could be in the TMS320C6xxx or TMS320C5xxx families from Texas Instruments.

2. Two Antennas

FIG. 1a heuristically illustrates a TxAA (transmit adaptive array) diversity arrangement including a Node B (e.g., a base station) with two transmit antennas and a single mobile user. The base station transmits a common pilot channel (CPICH) from antenna 1, an orthogonal common pilot channel (also termed CPICH) from antenna 2, plus a downlink shared data channel (DSCH) from both antennas. FIG. 1b shows the modulation pattern for the CPICH from the two antennas. In case transmit diversity (open or closed loop) is used on any downlink channel in the cell, the CPICH shall be transmitted from both antennas using the same channelization and scrambling code. In this case, the predefined bit sequence of the CPICH is different for Antenna 1 and Antenna 2; see FIG. 1b. In the case of no transmit diversity, the bit sequence of Antenna 1 in FIG. 1b is used. While the Primary CPICH is normally used for channel estimation of the DSCH, it is also possible that a Secondary CPICH could be used instead. In the case of a Secondary CPICH, the UE is informed about this by higher-layer signaling. The UE (user equipment, mobile user) can use the appropriate CPICH (Primary or Secondary) that is used as the phase reference for the DSCH, and this reference is simply denoted as CPICH in the following. Differing codes distinguish between the CPICH and the DSCH, and for multiple mobile users or multicode transmission the DSCH includes multiple codes to separate the multiple data streams. In response to feedback from a mobile user, the base station sets a power level to approximate a target signal-to-interference ratio (SIR) at that mobile user; FIG. 1a does not indicate this power control. Note that the pilot channels are common to all mobile users and are typically not power adjusted on a slot-by-slot basis.

To optimize the DSCH transmission to the mobile user, the base station adjusts the phase and possibly the amplitude (weights $w_1$ and $w_2$) of the data signal to antenna 1 and antenna 2 by weights $w_1$ and $w_2$, respectively. Note that $w_1$ and $w_2$ typically would be quantized, and the mobile user provides feedback to the base station for the adjustments. In the most commonly used mode for TxAA, Mode 1, the relative amplitudes are not adjusted but only the relative phases. In the less common mode, Mode 2, the amplitudes are adjusted so that the power is distributed 80% to one antenna and 20% to the other antenna.

The ratio, A, of pilot channel transmit amplitude to data channel transmit amplitude is expressed in terms of transmit powers as:

$$A^2 = (\text{CPICH power})/(\text{DSCH power})$$

where "CPICH power" is the sum of the transmit power of the CPICH from the two antennas and "DSCH power" is the transmit power (both antennas) of the data channel to the mobile user under consideration. A is presumed constant within the three time slots of a TTI.

In this section the normalization factors are found for the simple case of single path channels and two transmit antennas. In section 3 the method of finding the normalization factors with multipaths and with arbitrary numbers of transmit and receive antennas is presented. Thus the mobile user (with a single tracking unit for the DSCH) receives (in terms of despread baseband signals) a transmitted data symbol $s(1,k)$ in time slot 1 as:

$$r(1,k) = (w_{11} h_{11} + w_{21} h_{21}) s(1,k) + n(1,k)$$

where $w_{11}$ is the weight (amplitude and phase) of data symbols on antenna 1, $h_{11}$ is the (single path) transmission channel (attenuation and phase shift) from antenna 1 to the mobile user, $w_{21}$ and $h_{21}$ are the analogs for antenna 2, and $n(1,k)$ is the additive white noise received and has variance $N_0 = \sigma^2$. Note that with a spreading factor 16 for data symbols, k denotes one of 160 symbols in time slot 1. Of course, the $w_{n1}$ and $h_{n1}$ are not known and need to be estimated (using the pilot channels, data channel, and feedback), and then a soft estimate for $s(1,k)$ arises from normalizing the matched filter output:

$$y(1,k) = (w_{11}^* h_{11}^* + w_{21}^* h_{21}^*) r(1,k)$$

Indeed, the zero-forcing (normalized) soft estimate of $s(1,k)$ would be $z(1,k) = y(1,k)/|w_{11} h_{11} + w_{21} h_{21}|^2$.

In time slot 1 the mobile user can make estimates from the CPICH pilot channels to generate estimates $A\hat{h}_{11}$ and $A\hat{h}_{21}$ of the two transmission channels. But as noted, proper scaling for the received data symbol estimates requires additional information. For 16-QAM the mobile user needs to know how to scale (normalize) the received symbol estimates after maximal ratio combining (MRC) to be compatible with the symbol constellation so that the correct non-zero thresholds for decisions can be used. (Recall for QPSK only the signs of the real and imaginary parts of estimates are used.) Also, for both 16-QAM and QPSK the correct scaling (normalization) is needed for correct log likelihood ratios (LLRs) for input into a Turbo decoder. Indeed, to compute an LLR, both the mean received data symbol energy, $E_s$, and the noise variance, $N_0$, on the data symbols need to be estimated.

In particular, the LLRs, in terms of the bits $u_k$ defining a symbol s (e.g., two bits for a QPSK symbol, four bits for a 16-QAM symbol, etc.) and with (normalized) soft estimate z of data symbol s, are $$LLR(u_k) = \log\{P[u_k = 1|z]/P[u_k = 0|z]\}$$
$$= \log\{p(z|u_k = 1)/p(z|u_k = 0)\} + \log\{P[u_k = 1]/P[u_k = 0]\}$$

The LLRs can be computed using a channel model: for an AWGN channel with the residual interference (interference which is not cancelled) also a zero-mean, normally-distributed, independent random variable; the conditional probabilities are:

$$p(z|s=c) \sim \exp(-|z-c|^2/\gamma)$$

where $\gamma$ is the normalization that includes the scaling that made z match the symbol constellation (e.g, $|w_{11}h_{11}+w_{21}h_{21}|^2$) together with the signal-to-noise $E_s/N_0$. Then an approximation to the $LLR(u_k)$ is $$LLR(u_k) \approx 1/\gamma \{\min_{k=0}|z-c_{k=0}|^2 - \min_{k=1}|z-c_{k=1}|^2\}$$

where the subscripts "k=1" or "k=0" indicate minimizations over symbols c in the constellation with kth bit 1 or 0, respectively.

Now the mobile user can directly estimate the characteristics of the two transmission channels for time slot 1 by use of the two pilot channels to yield $A\hat{h}_{11}$ and $A\hat{h}_{21}$. Indeed, the measurement of the 10 pilot symbols of time slot 1 also provides an estimate of the noise variance for the transmission channels; and this provides an estimate for SINR of each of the two transmission channels which are used for normalization in the LLRs. The noise variance can be computed in conventional manner: the pilot symbols are first averaged to generate a reference channel estimate. Then the channel estimate is subtracted from each of the pilot symbols, and the results are squared and averaged. This computation yields the variance on the despread pilot symbols. Because the data symbols have a spreading factor of 16 but the pilot symbols have a spreading factor of 256, the variance on the data symbols is the variance on the pilot symbols divided by 16 (=256/16). The noise variance can also be directly computed from the data symbols in a decision directed manner. The initial data decisions are removed from the received data symbols, and then a standard variance estimator is used.

The weights $w_{11}$ and $w_{21}$ can be estimated from the prior time slot (prior TTI) weights together with the adjustments fed back to the base station. A verification method can be applied to any received pilot symbols embedded in the data stream.

Recall that the pilot symbol amplitudes differ from the data symbol amplitudes by the factor A. Hence, only a further estimate for A is needed to then estimate the normalization for the data symbols.

And A is presumed constant throughout the TTI. Now for time slots 2 and 3 the received signals are $$r(2,k)=(w_{12}h_{12}+w_{22}h_{22})s(2,k)+n(2,k)$$

$$r(3,k)=(w_{13}h_{13}+w_{23}h_{23})s(3,k)+n(3,k)$$

And with an estimate for A in time slot 1, the normalizations to obtain the corresponding soft estimates z(2,k) and z(3,k) are just the normalization for z(1,k) multiplied by the factors $|w_{11}h_{11}+w_{21}h_{21}|^2/|w_{12}h_{12}+w_{22}h_{22}|^2$ and $|w_{11}h_{11}+w_{21}h_{21}|^2/|w_{13}h_{13}+w_{23}h_{23}|^2$, respectively. Of course, $\hat{h}_{1m}$, $\hat{h}_{2m}$, $\hat{w}_{1m}$, and $\hat{w}_{2m}$ may be estimated for time slots 2 and 3 in the same manner as for time slot 1.

Two preferred embodiment methods estimate the scaling factor A from the detected y(1,k). A first method separates the real and imaginary parts and uses the lack of correlation of noise with signals plus the equivalence of the average magnitudes of the real and imaginary parts of the symbols to yield:

$$\hat{A}^{-1} = <(|Re\{y(1,k)\}|+|Im\{y(1,k)\}|)/2f(1)E[|s_r(1,k)|]>$$

where $E[|s_R(1,k)|]$ denotes the a priori average magnitude of $Re\{s(1,k)\}$ over symbols in time slot 1; <.> denotes averaging over the detected y(1,k) in time slot 1; and f(1) comes from the pilot channel estimates plus weight estimates in time slot 1; namely, $f(1)=|A\hat{h}_{11}\hat{w}_{11}+A\hat{h}_{21}\hat{w}_{21}|^2$. Simulations (see section 4) indicate that averaging over 32 data symbols (out of 160 in time slot 1) typically suffices. Of course, using the imaginary part of the symbol rather than the real part provides an analogous estimation.

A second estimation method also uses the lack of correlation between the noise and the data symbols and just computes squared magnitudes:

$$E[|y(1,k)|^2] = \hat{A}^{-2}f(1)^2 E[|s(1,k)|^2] + f(1)\sigma^2.$$

Rearranging gives:

$$\hat{A}^{-2} = <(|y(1,k)|^2 - f(1)\sigma^2)/f(1)^2 E[|s(1,k)|^2]>$$

This method requires an estimate for $\sigma^2$ which can be found from the pilot channels or data symbols as previously described. Note for 16-QAM the symbol constellation has $s(1,k)\epsilon\{\pm 1\pm j, \pm 1\pm j3, \pm 3\pm j, \pm 3\pm j3\}$ and thus $E[|s_R(1,k)|]=2$ and $E[|s(1,k)|^2]=10$. Similarly, for QPSK the symbol constellation has $s(1,k)\epsilon\{\pm 1\pm j\}$ and thus $E[|s_R(1,k)|]=1$ and $E[|s(1,k)|^2]=2$.

In summary, for a TxAA system using a three-time-slot TTI, various preferred embodiment methods provide (1) data channel estimates from the pilot channels, antenna weight estimates, and the amplitude factor A in (part of) time slot 1; (2) normalization for time slot 1 from data channel estimates plus noise estimates from the pilot channels; (3) normalizations in time slots 2 and 3 from time slot 1 normalization together with estimates of ratios of the weighted data channels.

3. Multiple Antennas

In general the transmitter will have P antennas and the receiver will have Q antennas. Initially, presume a single path transmission channel from each transmit (base station) antenna to each receiver (mobile user) antenna: let H(m,k) denote the QxP channel matrix (attenuation and phase shift) from the base station antennas to the mobile user antennas for transmission of the kth symbol (k=1,2, . . . , K) in time slot m (m=1,2, . . . , M) of a transmit time interval (TTI). Likewise, let w(m) denote the antenna weights for the transmit antennas during time slot m. Consequently, for transmitted symbol s(m,k) the mobile user receives the Q-vector r(m,k):

$$r(m,k)=H(m,k)w(m)s(m,k)+n(m,k)$$

where n(m,k) is the Q-vector of received additive noise having each component with mean 0 and variance $\sigma^2$.

Then at the receiver for the mth time slot, the antenna weights of the prior tie slot, w(m−1), can be used as an estimate, $\hat{w}(m)$, for the current weights. Also, w(m−1) can be adjusted by the bits fed back to the base station. The channel matrix for the pilot channels (one for each transmit antenna) is A H(m,k).

To derive the signal model that is used for estimation, the implicit assumption is made that the channel matrix and antenna weight estimates are accurate: $\hat{H}(m,k)=H(m,k)$ and $\hat{w}(m)=w(m)$. Thus by measuring the received pilot symbols, the receiver has available the composite transmission channel characteristics Q-vector, $c(m,k)=A\,H(m,k)\,w(m)$.

Note that the estimate of w(m) can be obtained from the knowledge of the previous weights used, w(m−1), plus the feedback bits that the mobile user sent to the base station to adjust the weights; this is the no verification case. The mobile user can also use antenna verification to improve the probability of determining the weights that the base station actually used. There can be a difference in the w(m) obtained with and without antenna verification because there can be bit errors in the feedback from the mobile user to the base station.

Then applying $c(m,k)^H$ to the Q-vector of received signals yields the measured (non-normalized) soft decision statistic for transmitted data s(m,k) as:

$$y(m,k) = c(m,k)^H r(m,k)$$
$$= A^{-1}\|c(m,k)\|^2 s(m,k) + c(m,k)^H n(m,k)$$
$$= A^{-1} f(m,k) s(m,k) + \eta(m,k)$$

where $\eta(m,k)$ is a 1-dimensional Gaussian random variable with mean 0 and variance equal $f(m,k)\,\sigma^2$. Thus the normalized soft estimate for s(m,k) is $z(m,k)=A\,y(m,k)/f(m,k)$. Note that this soft decision statistic broadly applies, such as with multipath channels where RAKE receivers, interference cancellers, and/or equalizers can be used. In this case, different receivers have different gain terms f(m,k), and f(m,k) is available as the squared norm of c(m,k). Thus only A needs be estimated. In multipath channels with a RAKE receiver, c(m,k) includes the channel estimates for all the fingers assigned to the multipaths so that maximal ratio combining can be performed. When a linear interference canceller (IC) or equalizer is used, c(m,k) also includes the IC or equalizer coefficients.

As previously described, two preferred embodiment methods estimate the scaling factor A from the expression for y(m,k). A first method separates the real and imaginary parts and uses the lack of correlation of noise with symbols:

$$\hat{A}^{-1}=<(|Re\{y(m,k)\}|+|Im\{y(m,k)\}|)/2f(m,k)E[|s_R(m,k)|]>$$

where $E[|s_R(m,k)|]$ denotes the average magnitude of $Re\{s(m,k)\}$ over symbols in a time slot, and <.> likewise denotes averaging over symbols in a time slot. Simulations (see section 4) indicate that averaging over 32 symbols (0.2 slot) typically suffices.

A second method uses squared magnitudes together with the lack of correlation between the noise and the symbols:

$$E[|y(m,k)|^2]=\hat{A}^{-2}f(m,k)^2 E[|s(m,k)|^2]+f(m,k)\sigma^2.$$

Rearranging gives:

$$\hat{A}^{-2}=<(|y(m,k)|^2-f(m,k)\sigma^2)/f(m,k)^2 E[|s(m,k)|^2]>$$

This method requires an estimate for $\sigma^2$ which can be found from the pilot channel as previously described. Note for 16-QAM the symbol constellation has $s(m,k) \in \{\pm 1 \pm j, \pm 1 \pm j3,$ $\pm 3 \pm j, \pm 3 \pm j3\}$ and thus $E[|s_R(m,k)|]=10$. Similarly, for QPSK the symbol constellation has $s(m,k) \in \{\pm 1 \pm j\}$ and thus $E[|s_R(m,k)|]=1$ and $E[|s(m,k)|^2]=2$.

These estimates also extend to the case of f(m,k) varying symbol to symbol; the estimation averaging is then a moving average.

When the gain term A is constant over a TTI, $f(m,k)=f(m)$ and the estimate for f(m) in the first time slot of a TTI can be used for all other time slots.

The normalization factor, $\hat{A}^{-1}f(m,k)$, applied to detected y(m,k) gives the soft estimate $z(m,k)=y(m,k)/\hat{A}^{-1}f(m,k)$ for use in the log-likelihood ratios.

In short, the preferred embodiment method at the mobile user performs steps as illustrated in FIG. 1c:

(1) mix down to the baseband; and if a RAKE receiver, allocate fingers (tracking units) to multipaths followed by maximal ratio combining to yield an output for each transport channel despread.

(2) for time interval corresponding to kth data symbol in the mth time slot of a (packet) transmit time interval (TTI), use pilot channels to measure/estimate each channel (with amplitude scaling A) from a transmit antenna to a receiver antenna plus estimate the noise power; this estimates A H(m,k) and $\sigma^2$.

(3) estimate weights w(m) from prior time slot weights together with information fed back to the base station. This provides $c(m,k)=A\,H(m,k)\,w(m)$.

(4) estimate factor A from received signals by energy and results of (2); this is $\hat{A}^{-2}=<(|y(m,k)|^2-f(m,k)\sigma^2)/f(m,k)^2 E[|s(m,k)|^2]>$ or $\hat{A}^{-1}=<(|Re\{y(m,k)\}|+|Im\{y(m,k)\}|)/2f(m,k)E[|Re\{s(m,k)\}|]>$ with $f(m,k)=\|c(m,k)\|^2$.

(5) apply normalization $\hat{A}^{-1}f(m,k)$ to detected symbols $y(m,k)=c(m,k)^H r(m,k)$ where r(m,k) is the received signal to yield normalized soft estimate $z(m,k)=y(m,k)\hat{A}/f(m,k)$.

(6) compute LLR from results of (5) and noise power.

4. Simulations

Figure 3A:
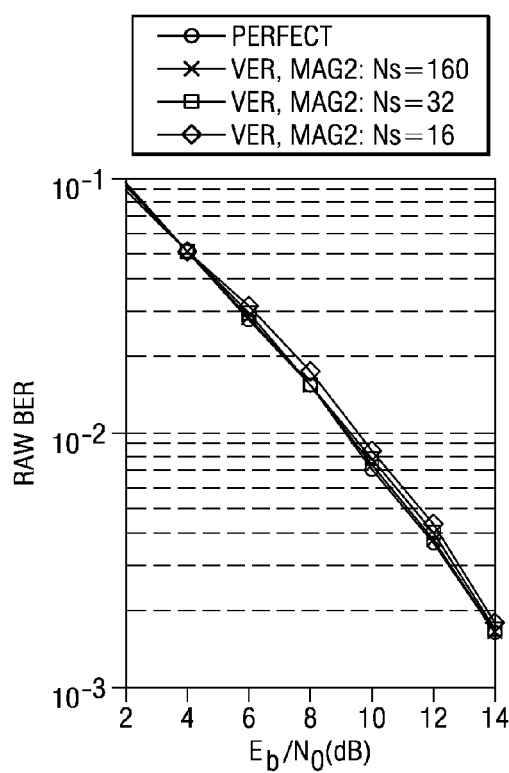
FIGS. 3a-3d are simulation results.
Figure 3B:
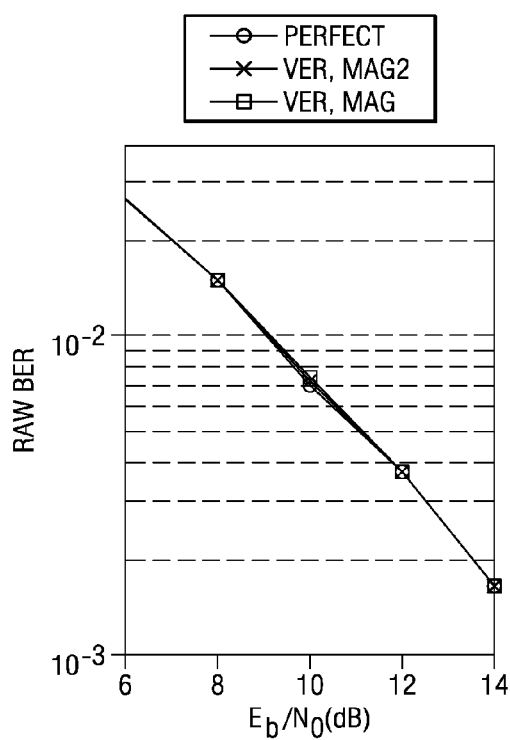
Figure 3C:
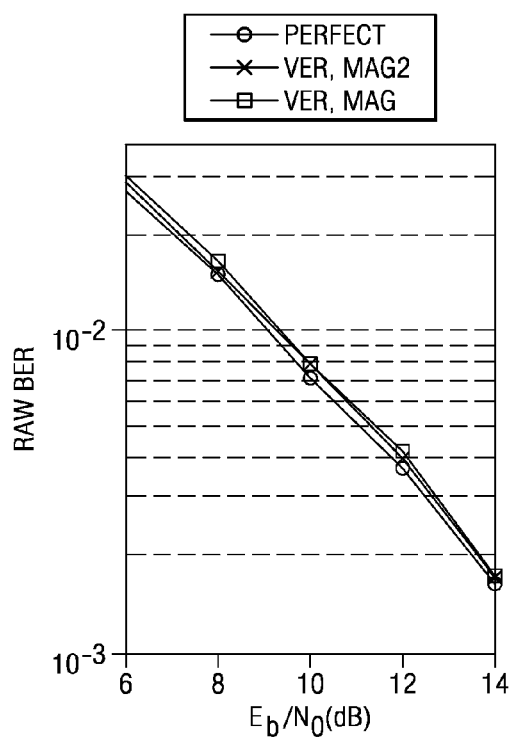
Figure 3D:
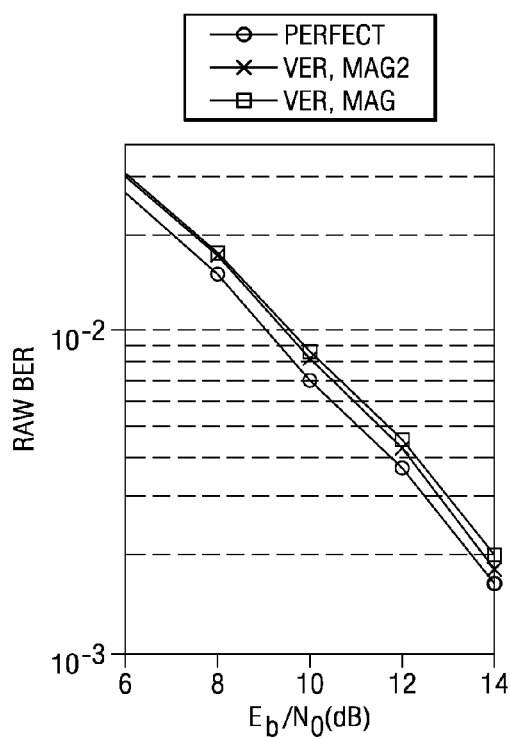

FIGS. 3a-3d show simulation results with raw bit error rate (BER) as a function of signal-to-noise (SNR) expressed as the ratio of bit energy ($E_b$) to noise power ($N_0$). FIG. 3a shows results with TxAA mode 1 (spreading factor equal 16) with 16-QAM modulation and a mobile user speed of 3 kmph with a 4% error rate for the bits fed back from the mobile user to the base station to adjust antenna weights. The curve marked "perfect" assumes perfect antenna weight verification and channel estimation. "MAG2" indicates use of the second method of estimation for A (magnitudes squared), and "Ns" is the number of symbols used in the averaging. FIGS. 3b-3d compare the two estimation methods for A; and "VER" means that actual antenna verification was used. In all cases, the two estimation methods for A performed about equally well. Apparently, 32 symbols (0.2 time slot) is sufficient averaging time for the estimation of A.

5. Modifications

The preferred embodiments can be modified in various ways while retaining one or more of the features of estimating soft estimate normalization for a first time slot and extending by correction factors, and power scaling factor estimation.

For example, the number of antennas and the antenna array geometry can be varied; beam forming can be used together with the estimation methods, the mobile user could have multiple antennas and use transmit diversity so the estimation methods would be used at the base station, the amplitude estimation could be used with a single transmit antenna system or two open loop transmit diversity like space time transmit diversity (STTD) or STS, the number of pilot symbols or data symbols used to average over can be varied, and so forth.

What is claimed is:

1. A communication reception method, comprising:
   (a) receiving pilot and data signals transmitted from a plurality of antennas of a transmitter;
   (b) estimating a data channel from said transmitter for a first time slot of a transmission time interval using (i) said received pilot signals in said first time slot, (ii) estimates of weights of said antennas for said first time slot, and (iii) said received data signals in said first time slot; and
   (c) estimating said data channel for a second time slot of said transmission time interval using the results of step (b) together with (i) said received pilot signals in said second time slot and (ii) estimates of weights of said antennas for said second time slot.

2. The method of claim 1, wherein:
   (a) said estimating of step (b) of claim 1 uses averaging including squared magnitudes of said received data signals.

3. The method of claim 1, wherein:
   (a) said estimating of step (b) of claim 1 uses averaging including magnitudes of real and imaginary parts of said received data signals.

4. The method of claim 1, wherein:
   (a) said estimates of weights for said second time slot of step (c) of claim 1 derive from estimates of said weights for said first time slot together with information sent to said transmitter.

5. The method of claim 1, wherein:
   (a) said estimating of step (b) of claim 1 includes estimating noise variance of said data channel using said received pilot signals.

6. The method of claim 1, wherein:
   (a) said estimating of step (b) of claim 1 includes estimating noise variance of said data channel using said received data signals.

7. The method of claim 1, wherein:
   (a) one or more of the following receivers are used: RAKE receiver, multipath interference canceller, or equalizer.

8. A communication reception method comprising:
   (a) receiving pilot and data signals transmitted from a plurality of antennas of a transmitter; and
   (b) estimating a data channel from said transmitter using (i) said received pilot signals, (ii) estimates of weights of said antennas, and (iii) averages including squared magnitudes of said received data signals;
   (c) wherein said averages of step (b) are averages over sets of transmitted symbols and include averages of $|y(m,k)|^2 f(m,k)\sigma^2)/f(m,k)^2 E[|s(m,k)|^2]$ where $y(m,k)$ is a detection of transmitted data symbol $s(m,k)$, $f(m,k)$ is a squared magnitude of a pilot channel estimation including antenna weights, $\sigma^2$ is a noise variance estimation, and F denotes expectation.

9. A communication reception method, comprising:
   (a) receiving pilot and data signals transmitted from a plurality of antennas of a transmitter; and
   (b) estimating a data channel from said transmitter using (i) said received pilot signals, (ii) estimates of weights of said antennas, and (iii) averages including magnitudes of real and imaginary parts of said received data signals;
   (c) wherein said averages of step (b) are averages over sets of transmitted symbols and include averages of $(|Re\{y(m,k)\}|+|Im\{y(m,k)\}|)/2f(m,k)E[|Re\{s(m,k)\}|]$ where $y(m,k)$ is a detection of transmitted data symbol $s(m,k)$, $f(m,k)$ is a squared magnitude of a pilot channel estimation including antenna weights, and F denotes expectation.

10. A communication reception method, comprising:
    (a) receiving pilot and data signals transmitted from a plurality of antennas of a transmitter;
    (b) estimating a data channel from said transmitter using (i) said received pilot signals for a first set of transmitted pilot symbols within a first time slot, (ii) estimates of weights of said antennas for said first time slot, and (iii) averages of said received data signals for a first set of transmitted data symbols; and
    (c) re-estimating said data channel using the results of step (b) together with said received pilot signals for a second set of transmitted pilot symbols within said first time slot.

11. The method of claim 10, wherein:
    (a) said averages of step (b) of claim 10 include averages of $(|y(m,k)|^2 f(m,k)\sigma^2)/f(m,k)^2 E[|s(m,k)|^2]$ where $y(m,k)$ is a detection of transmitted data symbol $s(m,k)$ of a first set of data symbols, $f(m,k)$ is a squared magnitude of a pilot channel estimation including antenna weights and from said first set of pilot symbols, $\sigma^2$ is a noise variance estimation, and F denotes expectation.

12. The method of claim 10, wherein:
    (a) said averages of step (b) of claim 10 include averages of $(|Re\{y(m,k)\}|+|Im\{y(m,k)\}|)/2f(m,k)E[|Re\{s(m,k)\}|]$ where $y(m,k)$ is a detection of transmitted data symbol $s(m,k)$ of said first set of data symbols, $f(m,k)$ is a squared magnitude of a pilot channel estimation including antenna weights and from said first set of pilot symbols, and E denotes expectation.

13. The method of claim 10, wherein:
    (a) one or more of the following receivers are used: RAKE receiver, multipath interference canceller, or equalizer.

* * * * *